United States Patent [19] [11] 3,985,664
Sakaguchi et al. [45] Oct. 12, 1976

[54] TONER COMPOSITION FOR USE IN ELECTROPHOTOGRAPHY COMPRISING NOVEL POLYESTER BINDER RESIN

[75] Inventors: Kahei Sakaguchi; Hirotaka Takemoto, both of Wakayama, Japan

[73] Assignee: Kao Soap Co., Ltd., Tokyo, Japan

[22] Filed: Dec. 27, 1974

[21] Appl. No.: 536,903

[30] Foreign Application Priority Data
Dec. 29, 1973 Japan.................................. 49-3687

[52] U.S. Cl....................... 252/62.1 R; 252/62.1 P; 252/62.1 L; 260/40 R; 260/75 N; 427/14; 427/19; 260/28 R; 260/835; 260/873
[51] Int. Cl.²...................... G03G 9/08; G03G 9/12; G03G 9/10
[58] Field of Search.................. 260/75 N, 40 R, 28, 260/835, 873; 427/14, 19; 252/62.1

[56] References Cited
UNITED STATES PATENTS

| | | | |
|---|---|---|---|
| 3,366,591 | 1/1968 | Marshall et al. | 260/75 N |
| 3,590,000 | 6/1971 | Palermiti et al. | 252/62.1 P |
| 3,681,106 | 8/1972 | Burns et al. | 252/62.1 P |
| 3,748,309 | 7/1973 | Hunsucker et al. | 260/75 N |
| 3,819,367 | 6/1974 | Chatterji et al. | 252/62.1 P |
| 3,882,188 | 5/1975 | Behmel | 260/75 N |

*Primary Examiner*—Mayer Weinblatt
*Assistant Examiner*—John D. Smith
*Attorney, Agent, or Firm*—Woodhams, Blanchard and Flynn

[57] ABSTRACT

A toner composition for use in electrophotography and capable of being charged with a positive electric charge, which comprises 1 to 20 parts by weight of a colorant and 80 to 99 parts by weight of a resin, characterized in that said resin consists essentially of
a. from 55 to 100 percent by weight of polyester resin which has a softening point of 80° to 130°C. measured in accordance with ASTM-E28-51T (ring and ball method), which has a nitrogen content of from 0.3 to 1.5 percent by weight, based on the total weight thereof, and which is obtained by the reaction of;
1. a dicarboxylic acid component containing 50 mol percent or more of a dicarboxylic acid, or an anhydride thereof, selected from the group consisting of fumaric acid, maleic acid and succinic acid; with
2. a polyol component containing 10 mol percent or more of a glycol having the formula

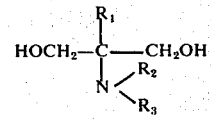

wherein $R_1$, $R_2$ and $R_3$, which can be the same or different, each is hydrogen or alkyl having 1 to 4 carbon atoms, and b. the balance of said resin, i.e., 0 to 45 percent by weight of said resin, is a resin which has a softening point of 80° to 150°C. and is selected from the group consisting of polystyrene, rosin maleate, petroleum resin and epoxy resin.

10 Claims, No Drawings

TONER COMPOSITION FOR USE IN ELECTROPHOTOGRAPHY COMPRISING NOVEL POLYESTER BINDER RESIN

BACKGROUND OF THE INVENTION

1. Field of the Invention

This invention relates to a toner composition for use in electrophotography. More particularly, this invention relates to a toner composition for use in electrophotography which, in both indirect and direct developing methods of electrophotography, is uniformly charged with a strong positive electric charge thereby permitting clear development of negative electrostatic latent images without any fogging.

2. Description of the Prior Art

As is known well, xerography is a type of electrophotography which uses static electricity. Likewise there have been practiced several methods for developing the electrostatic latent image which is formed on the surface of an insulating substance. Of these methods, the most widely commercially used methods are the cascade method in which glass beads are used as a carrier for the toner, and a magnetic brush method in which iron powder is used as the carrier. In both of these two methods, the toner particles are charged by friction and are dusted onto the electrostatic latent image by means of electrostatic attraction.

A toner is a colored resin powder which, when charged by friction either by the cascade method or the magnetic brush method, should be charged uniformly either completely negative or completely positive, and it should, when developed form a clear image free from fog or indistinct margins on the visible image. In addition, various other properties are generally required for toners, including the following:

the electrification (or charging capability) of the toner should not be influenced greatly by humidity, but rather it should always be substantially constant under varying humidity conditions to ensure stable charging;

the toner should be melt sharply at a relatively low temperature (however, toners which cause caking or are viscous at normal temperature (20° to 25°C.) are not preferred);

the surface of a photosensitive layer should be washed readily;

it should have good abrasion resistance;

it should have good fixability to a sheet of paper to form a copy;

it should have a proper fluidity;

it should admix well with a colorant;

it should not generate an unpleasant smell or poisonous gases during developing; and the resin per se should readily be pulverized to a particle size of 5 to 20 microns.

When the non-exposed portion of the surface of the photosensitive layer, prior to the developing step, is charged with a negative electric charge after charging and exposure, a positive picture cannot be obtained unless it is developed with a toner which is charged with a positive electric charge. Most resin powders imparted with friction by the cascade method using glass beads as the carrier or by the magnetic brush method using iron powder as the carrier, however, are charged with a negative charge, and very few of them are charged with a positive electric charge.

There has heretofore been known, as a positive-charging toner, a composition wherein a colorant (such as carbon black) and a charge-control agent are blended with a thermoplastic binder resin. If the composition according to the conventional method comprises only a two-component system consisting of the thermoplastic resin such as polystyrene or polyester resin and the colorant, and it does not contain the charge-control agent, the composition can be charged with only a small negative electric charge or a small positive electric charge by friction thereof with the carrier. In order to impart to the toner a strong negative or strong positive electric charge, therefore, it is necessary to add a charge-control agent. In order to impart to the toner a strong negative charge, for example, there is known the method disclosed in Japanese Patent Publication No. 26478/70 in which an azo-type oil-soluble dye containing a complex of chromium is added as a charge-control agent. Alternatively, in order to give a strong positive charge, a basic dye is added.

One of the primary difficulties and disadvantages of these methods for controlling frictional charging by the use of the charge-control additive is that the additive does not admix well in the thermoplastic resin and it does not disperse uniformly therein. As a consequence the surfaces of the resulting toner particles are not charged uniformly, either negative or positive, thereby causing fogging or trailing phenomena at the development and thereby preventing the obtaining of clear and sharp developed images.

SUMMARY OF THE INVENTION

It is, therefore, an object of this invention to provide a toner composition for use in electrophotography, in which the fine toner particles are, as a whole, uniformly charged with a strong positive electric charge, thereby providing clear and sharp developed images at development, either by the direct or indirect developing method, wherein the development is effected in accordance with the cascade method or the magnetic brush method.

Another object of this invention is to provide a toner composition which adequately satisfies the general requirements for a toner as mentioned in the foregoing paragraphs.

A further object of this invention is to provide an improved toner composition which does not incur the abovementioned fogging phenomenon and the like and which does not require the addition thereto of a charge-control agent.

This invention provides a toner composition, capable of being positively charged, for use in electrophotographic development, which comprises 1 to 20 parts by weight of a colorant and 80 to 99 parts by weight of a resin composition, characterized in that the resin composition consists essentially of a. from 55 to 100 percent by weight of a polyester resin (first resin component) which has a softening point of 80° to 130° C. measured in accordance with ASTM-E28-51T (ring and ball method), which has a nitrogen content of from 0.3 to 1.5 percent by weight, based on the total weight thereof and which is obtained by the reaction of;

1. a dicarboxylic acid component containing 50 mol percent or more of a dicarboxylic acid, or an anhydride thereof, selected from the group consisting of fumaric acid, maleic acid, succinic acid, maleic anhydride and succinic anhydride; with
2. a polyol component containing 10 mol percent or more of a glycol having the formula

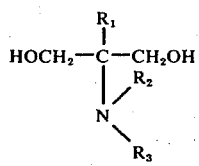

wherein $R_1$, $R_2$ and $R_3$, which can be the same or different, each is hydrogen or alkyl having 1 to 4 carbon atoms, and b. the balance of said resin composition, i.e., from 0 to 45 percent by weight of said resin composition, is a resin (optional second resin component) which has a softening point of 80° to 150° C. and is selected from the group consisting of polystyrene, rosin maleate, petroleum resin and epoxy resin.

In accordance with the invention, there is provided a toner composition which can be sufficiently strongly and uniformly charged with a positive electric charge, without requiring addition thereto of a charge-control agent, because of the presence of a specific thermoplastic resin (first resin component) having a specific chemical structure which, critically, can be charged strongly with a positive electric charge when used under specific conditions. This invention critically requires the use of a saturated or unsaturated polyester resin component (a), which contains in its molecule amino groups, whereby the resulting toner composition can be charged to a strong, uniform, positive electric charge and it also satisfies all the aforementioned physical properties required for toners.

Referring to the polyol component (2), it is critical that this consist of from 10 to 100 mol percent of a glycol of formula (I). Typical examples of the glycol of the formula (I) include, for example, 2-amino-2-methyl-1,3-propanediol, 2-amino-2-ethyl-1,3-propanediol, 2-dimethylamino-2-methyl-1,3-propanediol, 2-diethylamino-2-methyl-1,3-propanediol, 2-dimethylamino-2-ethyl-1,3-propanediol, 2-diethylamino-2-ethyl-1,3-propanediol, 2-methylethylamino-2-ethyl-1,3-propanediol, 2-dipropylamino-2-methyl-1,3-propanediol, 2-dipropylamino-2-ethyl-1,3-propanediol, 2-dibutylamino-2-methyl-1,3-propanediol, 2-dibutylamino-2-ethyl-1,3-propanediol, 2-amino-2-propyl-1,3-propanediol, 2-amino-2-butyl, 1,3-propanediol and the like.

The balance of the polyol component (2), i.e. from 0 to 90 mol percent thereof, consists of one or more polyester-forming polyols, such as ethyleneglycol, diethyleneglycol, triethyleneglycol, 1,2-propanediol, 1,4-butanediol, neopentylglycol, 1,4-bis(hydroxymethyl) cyclohexane, hydrogenated bisphenol A, polyoxyalkylene bisphenol A, polyoxyalkylenehydrogenated bisphenol A, glycerine, pentaerythritol and the like.

As the dicarboxylic acid compound (1) which is used for the preparation of the polyester resin in this invention, it is critical that this consists of 50 to 100 mol percent of fumaric acid, maleic acid or succinic acid, or an anhydride thereof. The balance of the dicarboxylic acid component, i.e. zero to 50 mol percent thereof, consists of one or more other unsaturated or saturated, aliphatic or aromatic, hydrocarbon, dicarboxylic acids, or anhydrides thereof, such as itaconic acid, phthalic acid, isophthalic acid, terephthalic acid, cyclohexanedicarboxylic acid, adipic acid, sebacic acid, malonic acid, oxalic acid and the like.

In order effectively to charge the toner with a positive electric charge, the nitrogen content in the polyester resin (a) used in the present invention is maintained in the range of from 0.3 to 1.5 percent by weight. In the polyester resin (a) employed in the present invention, the maximum content of nitrogen is 1.5 percent by weight.

The polyesterification reaction is carried out employing a ratio, by equivalent, of the polyol component to the dicarboxylic acid component in the range of 0.3 to 1.2/1.0, preferably 1.0/1.0, at a reaction temperature of 160° to 210° C., in a stream of inert gas (such as nitrogen gas) and carrying out the reaction until the acid value of the resulting polyester is below 50 so as thereby to yield a polyester having a softening point of 80° to 130° C.

The toner composition in accordance with the present invention comprises the abovementioned polyester resin and a colorant, and if desired, can further optionally contain conventionally known toner resins having a softening point of 80° to 150° C. such as polystyrene, rosin maleate, petroleum resin, epoxy resin and the like. The toner composition can further optionally contain, if required, a small amount of a charge-control agent, plasticizer, filler, etc. It is required that the polyester resin (a) is from 55 to 100 percent by weight, based on the total weight of the resins used in the composition. The balance of the total resins, i.e. from 0 to 45 percent by weight thereof, is one or more of the conventional toner binder resins.

As the colorant, a pigment or a dye can be used singly or as a mixture of two or more of them. The colorant employed is not critical and any conventional colorant for toners for electrophotography can be employed. Examples of suitable pigments are carbon black, prussian blue, rouge, cadmium yellow and the like. Likewise, examples of suitable dyes are naphthol B, Eriochrom B, phthalocyanine blue, Lithol Rubine and the like.

The abovementioned colorant is used in an amount of from 1 to 20 percent by weight, preferably 3 to 10 percent by weight, based on the total weight of the toner composition.

The toner composition of the present invention can be prepared either by the liquid spray method or by the pulverization method, both of which are conventional methods. In the case of the liquid spray method, a mixture of the resin and the colorant is dissolved in a solvent such as carbon tetrachloride, thereafter the resulting solution is sprayed, granulated into finely divided particles, dried and then recovered by electric titration. In the case of the pulverization method, a mixture of the resin and the colorant that has been dissolved and blended uniformly is further pulverized by a jet pulverizer to afford powders having a particle size of 5 to 20 microns.

The toner composition can be blended with glass beads or iron powder to form dry developers. The amount of glass beads or iron powder can be in the range conventionally employed, e.g. from 10 to 100 parts of glass beads or iron powder, per one part of toner composition (parts are by weight).

The toner in accordance with the present invention can be used not only for dry developing, i.e. as a dry powder, but also for a liquid developing agent for electrophotography wherein the toner is dispersed in an insulating liquid. In this case, too, the toner is charged positively in the liquid and develops or renders visible a negatively charged electrostatic latent image to afford a positive picture. The carrier liquid is conventional, normally a liquid hydrocarbon having a resistivity of more than $10^9$ Ω.cm and a dielectric constant of less than 3. The amount of the carrier liquid is in the range conventionally employed, e.g. from 10 to 100 parts of carrier liquid, per one part of toner composition (parts by weight).

The invention will be further described by reference to the following Synthesis Examples, Examples and Comparative Examples.

SYNTHESIS EXAMPLES 1–11

A 1-liter four-necked flask made of glass and equipped with a stirrer, a nitrogen-introducing pipe, a water-removal pipe and a thermometer is charged with the starting materials indicating respectively in the following Table 1. Under a stream of nitrogen, and distilling off the resulting water, the reaction is carried out at 170° to 200° C. to yield a polyester resin.

The acid value, softening point and the nitrogen content (weight percent) of each of the polyester resins thus prepared are shown in Table 1.

The abbreviations of the starting materials in the foregoing Table identify the following compounds:
AMPD: 2-amino-2-methyl-1,3-propanediol
AEPD: 2-amino-2-ethyl-1,3-propanediol
PO(2.2)BPA: polyoxypropylene(2,2)-2,2-bis(4-hydroxyphenyl) propane
HBPA: hydrogenated bisphenol A [2,2-bis(4-cyclohexanol) propane]
NPG: neopentylglycol
PG: propyleneglycol
EG: ethyleneglycol
GLy: glycerine
FA: fumaric acid
MA: maleic acid anhydride
PA: phthalic acid anhydride
IPA: isophthalic acid
SA: succinic acid
HQ: hydroquinone

COMPARATIVE EXAMPLE 1

90 Parts by weight of polystyrene (a product of Esso Standard Co., "Picolastic D125" (softening point = 125° C.)) is melt-blended with 10 parts by weight of carbon black on a heated roll, and after cooling and pulverizing, the mixture is further pulverized into finely Table 1

| Example | Starting Material | Weight (g) | Moles | Acid Value | Softening Point (° C) | N (wt. %) |
|---|---|---|---|---|---|---|
| 1 | AMPD | 21.0 | 0.2 | 32 | 95 | 0.34 |
|  | PO(2.2)BPA | 637.2 | 1.8 |  |  |  |
|  | FA | 232.2 | 2.0 |  |  |  |
|  | HQ | 0.36 |  |  |  |  |
| 2 | AEPD | 23.8 | 0.2 | 35 | 97 | 0.34 |
|  | PO(2.2)BPA | 637.2 | 1.8 |  |  |  |
|  | FA | 232.2 | 2.0 |  |  |  |
|  | HQ | 0.36 |  |  |  |  |
| 3 | AMPD | 42.1 | 0.4 | 28 | 95 | 0.73 |
|  | PO(2.2)BPA | 566.4 | 1.6 |  |  |  |
|  | FA | 232.2 | 2.0 |  |  |  |
|  | HQ | 0.34 |  |  |  |  |
| 4 | AMPD | 42.1 | 0.4 | 30 | 115 | 0.83 |
|  | PO(2.2)BPA | 283.2 | 0.8 |  |  |  |
|  | HBPA | 192.3 | 0.8 |  |  |  |
|  | FA | 232.2 | 2.0 |  |  |  |
|  | HQ | 0.30 |  |  |  |  |
| 5 | AMPD | 42.1 | 0.4 | 21 | 95 | 0.98 |
|  | PO(2.2)BPA | 283.2 | 0.8 |  |  |  |
|  | NPG | 83.4 | 0.8 |  |  |  |
|  | FA | 232.2 | 2.0 |  |  |  |
|  | HQ | 0.26 |  |  |  |  |
| 6 | AMPD | 42.1 | 0.4 | 23 | 90 | 1.02 |
|  | PO(2.2)BPA | 283.2 | 0.8 |  |  |  |
|  | PG | 60.9 | 0.8 |  |  |  |
|  | FA | 232.2 | 2.0 |  |  |  |
|  | HQ | 0.25 |  |  |  |  |
| 7 | AMPD | 42.1 | 0.4 | 22 | 90 | 1.05 |
|  | PO(2.2)BPA | 283.2 | 0.8 |  |  |  |
|  | EG | 50.2 | 0.8 |  |  |  |
|  | FA | 232.2 | 2.0 |  |  |  |
|  | HQ | 0.24 |  |  |  |  |
| 8 | AMPD | 21.0 | 0.2 | 25 | 100 | 0.35 |
|  | PO(2.2)BPA | 601.8 | 1.7 |  |  |  |
|  | GLy | 9.2 | 0.1 |  |  |  |
|  | FA | 232.2 | 2.0 |  |  |  |
|  | HQ | 0.35 |  |  |  |  |
| 9 | AMPD | 42.1 | 0.4 | 26 | 90 | 0.70 |
|  | PO(2.2)BPA | 566.4 | 1.6 |  |  |  |
|  | MA | 157.0 | 1.6 |  |  |  |
|  | PA | 59.2 | 0.4 |  |  |  |
|  | HQ | 0.33 |  |  |  |  |
| 10 | AMPD | 42.1 | 0.4 | 25 | 92 | 0.71 |
|  | PO(2.2)BPA | 566.4 | 1.6 |  |  |  |
|  | MA | 157.0 | 1.6 |  |  |  |
|  | IPA | 66.4 | 0.4 |  |  |  |
|  | HQ | 0.33 |  |  |  |  |
| 11 | AMPD | 21.0 | 0.2 | 30 | 100 | 0.34 |
|  | PO(2.2)BPA | 637.2 | 1.8 |  |  |  |
|  | SA | 236.2 | 2.0 |  |  |  |
|  | HQ | 0.36 |  |  |  |  |

Remarks:

divided particles to obain a toner having a particle size of 5 to 20 microns.

2 Parts by weight of the resulting toner are mixed with 100 parts by weight of iron powder (200 – 300 mesh) as a control toner.

Using the control toner composition, an electrophotosensitive sheet having a photosensitive layer of zinc oxide which forms a negatively charged electrostatic latent image, is developed by a magnetic brushing method. Although a negative picture is obtained, the intended positive picture cannot be obtained. The results are shown in the following Table 2.

COMPARATIVE EXAMPLES 2–4

Comparative Example 1 is repeated except that rosin maleate (softening point = 110° C.), petroleum resin (softening point = 90° C.) and epoxy resin Dow Chemical, DER 667 epoxy resin (softening point = 127°C.) are respectively used in place of polystyrene in Comparative Example 1. The results are shown in the following Table 2.

EXAMPLES 1–19

Toners having the respective compositions shown in Table 2 are prepared in the same way as in Comparative Example 1. These toners are used for development by means of a magnetic brush method to compare the results of using them with Comparative Examples 1–4. The results are shown in the following Table 2.

Table 2

| Example | Resin | (parts) by weight) | Carbon black (parts by weight) | Electrification capability of toner *1 | Image Character Positive or Negative | Density | Fog | Life (times) *2 | Evaluation (point) |
|---|---|---|---|---|---|---|---|---|---|
| Comp. Example 1 | Polystyrene | 90 | 10 | weakly negatively charged | Negative image | light | yes | 1,000 | 0 |
| Comp. Example 2 | Rosin maleate | 90 | 10 | weakly negatively charged | Negative image | light | yes | 1,000 | 0 |
| Comp. Example 3 | Petroleum resin | 90 | 10 | negatively charged | Negative image | dense | yes | 1,000 | 0 |
| Comp. Example 4 | Epoxy resin | 90 | 10 | weakly positively charged | Positive image | light | yes | 2,000 | 30 |
| Example 1 | Resin of Synthesis Example 1 | 90 | 10 | positively charged | Positive image | dense | no | 20,000 | 95 |
| Example 2 | Resin of Synthesis Example 2 | 90 | 10 | positively charged | Positive image | dense | no | 20,000 | 95 |
| Example 3 | Resin of Synthesis Example 3 | 90 | 10 | positively charged | Positive image | dense | no | 20,000 | 100 |
| Example 4 | Resin of Synthesis Example 4 | 90 | 10 | positively charged | Positive image | dense | no | 20,000 | 100 |
| Example 5 | Resin of Synthesis Example 5 | 90 | 10 | positively charged | Positive image | dense | no | 20,000 | 100 |
| Example 6 | Resin of Synthesis Example 6 | 90 | 10 | positively charged | Positive image | dense | no | 20,000 | 100 |
| Example 7 | Resin of Synthesis Example 7 | 90 | 10 | positively charged | Positive image | dense | no | 20,000 | 100 |
| Example 8 | Resin of Synthesis Example 8 | 90 | 10 | positively charged | Positive image | dense | no | 20,000 | 95 |
| Example 9 | Resin of Synthesis Example 9 | 90 | 10 | positively charged | Positive image | dense | no | 20,000 | 100 |
| Example 10 | Resin of Synthesis Example 10 | 90 | 10 | positively charged | Positive image | dense | no | 20,000 | 100 |
| Example 11 | Resin of Synthesis Example 11 | 90 | 10 | positively charged | Positive image | dense | no | 20,000 | 95 |
| Example 12 | Resin of Synthesis Example 3 / Resin of Comparative Example 1 | 50 / 40 | 10 | positively charged | Positive image | dense | no | 20,000 | 90 |
| Example 13 | Resin of Synthesis Example 3 / Resin of Comparative Example 1 | 70 / 20 | 10 | positively charged | Positive image | dense | no | 20,000 | 95 |
| Example 14 | Resin of Synthesis Example 3 / Resin of Comparative Example 2 | 50 / 40 | 10 | positively charged | Positive image | dense | no | 20,000 | 90 |
| Example 15 | Resin of Synthesis Example 3 / Resin of Comparative Example 2 | 70 / 20 | 10 | positively charged | Positive image | dense | no | 20,000 | 95 |
| Example 16 | Resin of Synthesis Example 3 / Resin of Comparative Example 3 | 50 / 40 | 10 | positively charged image | Positive | dense | no | 20,000 | 90 |
| Example 17 | Resin of Synthesis Example 3 / Resin of Comparative Example 3 | 70 / 20 | 10 | positively charged | Positive image | dense | no | 20,000 | 95 |
| Example 18 | Resin of Synthesis Example 3 / Resin of Comparative Example 4 | 50 / 40 | 10 | positively charged | Positive image | dense | no | 20,000 | 95 |
| Example 19 | Resin of Synthesis Example 3 / Resin of Comparative Example 4 | 70 / 20 | 10 | positively charged | Positive image | dense | no | 20,000 | 97 |

*1 After developing a negatively charged electrostatic latent image determination is made by image character.
*2 Life is expressed by number of times before a sharp picture cannot be obtained any more using the same toner.

The embodiments of the invention in which an exclusive property or privilege is claimed are defined as follows:

1. A toner composition capable of being charged with a positive electric charge and adapted for use in electrophotographic development, consisting essentially of finely divided particles containing from 1 to 20 parts by weight of a colorant and 80 to 99 parts by weight of binder resin, said binder resin consists essentially of
   a. from 55 to 100 percent by weight of a polyester resin having a softening point of 80° to 130°C. and a nitrogen content of from 0.3 to 1.5 percent by weight, based on the total weight of said polyester resin, said polyester being obtained by reacting
   1. a dicarboxylic acid component consisting essentially of from 50 to 100 mol percent of a substance selected from the group consisting of fumaric acid, maleic acid, succinic acid and anhydrides thereof, the balance of said dicarboxylic acid component being one or more polyester-forming dicarboxylic acids, or anhydrides thereof, with
   2. a polyol component consisting essentially of from 10 to 100 mol percent of a glycol having the formula

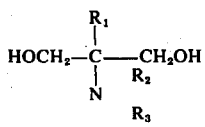

wherein $R_1$, $R_2$ and $R_3$, which can be the same or different, are hydrogen or unsubstituted alkyl having one to 4 carbon atoms, and the balance of said polyol component is one or more polyester-forming polyols, and
   b. the balance of said binder resin is a binder resin having a softening point of 80° to 150°C. selected from the group consisting of polystyrene, rosin maleate, petroleum resin and epoxy resin.

2. A toner composition as claimed in claim 1, in which said polyester-forming dicarboxylic acids are selected from the group consisting of itaconic acid, phthalic acid, isophthalic acid, terephthalic acid, cyclohexanedicarboxylic acid, adipic acid, sebacic acid, malonic acid and oxalic acid.

3. A toner composition as claimed in claim 1 in which said polyester-forming polyol is selected from the group consisting of ethyleneglycol, diethyleneglycol, triethyleneglycol, 1,2-propanediol, 1,4-butanediol, neopentylglycol, 1,4-bis-(hydroxymethyl) cyclohexane, hydrogenated bisphenol A, polyoxyalkylene bisphenol A, polyoxyalkylene hydrogenated bisphenol A, glycerine and pentaerythritol.

4. A process for developing electrostatic latent images which comprises imparting a positive charge to a toner composition as claimed in Claim 1 and then applying the toner composition to a copy substrate bearing a negative electrostatic latent image in order to render said latent image visible.

5. A toner composition as claimed in claim 1, in the form of particles having a size of from 5 to 20 microns, admixed with a substance selected from the group consisting of iron powder and glass beads, the amount of said substance being sufficient to impart a strong and uniform positive electric charge to said toner particles.

6. A toner composition as claimed in claim 1, in the form of particles having a size of 5 to 20 microns, blended in an insulating organic carrier liquid to form an electrophotographic developer liquid.

7. A composition as claimed in claim 5, containing from 10 to 100 parts by weight of said substance, per one part by weight of said toner composition.

8. A toner composition as claimed in claim 1, which is charged with a positive electric charge.

9. A toner composition as claimed in claim 1, containing from 3 to 10 parts by weight of said colorant, and said colorant is a pigment or dye or mixture thereof, for developing electrostatic latent images.

10. A toner composition as claimed in claim 7, which is charged with a positive electric charge.

* * * * *

UNITED STATES PATENT AND TRADEMARK OFFICE
CERTIFICATE OF CORRECTION

PATENT NO. : 3 985 664

DATED : October 12, 1976

INVENTOR(S) : Kahei Sakaguchi and Hirotaka Takemoto

It is certified that error appears in the above-identified patent and that said Letters Patent are hereby corrected as shown below:

Column 9, line 30; change the formula

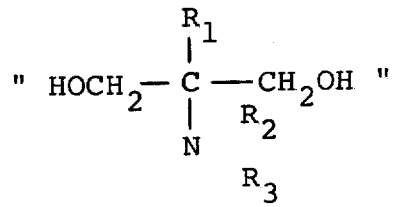

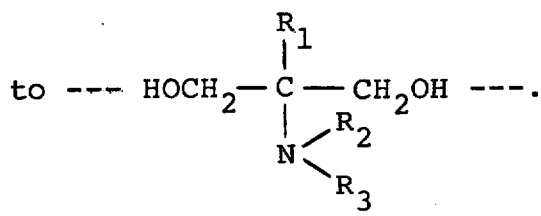

Signed and Sealed this

Twenty-second Day of March 1977

[SEAL]

Attest:

RUTH C. MASON
*Attesting Officer*

C. MARSHALL DANN
*Commissioner of Patents and Trademarks*